R. F. DARROW.
SIGNALING DEVICE FOR AUTOMOBILES.
APPLICATION FILED AUG. 13, 1915.
1,175,051.
Patented Mar. 14, 1916.
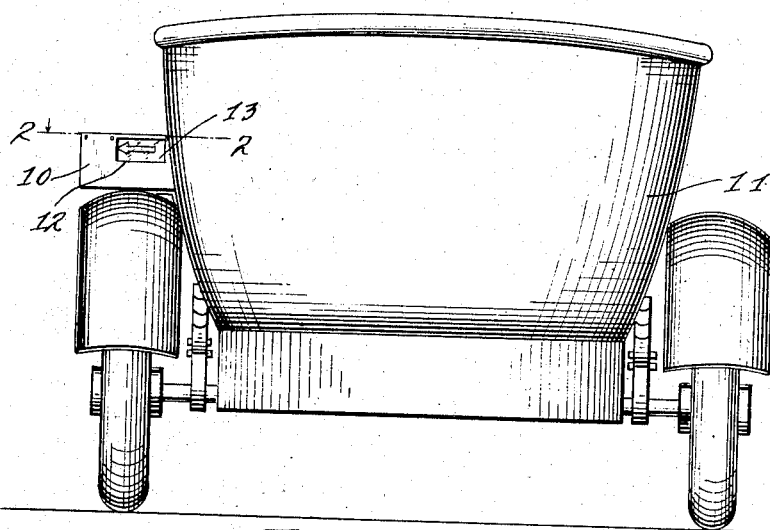
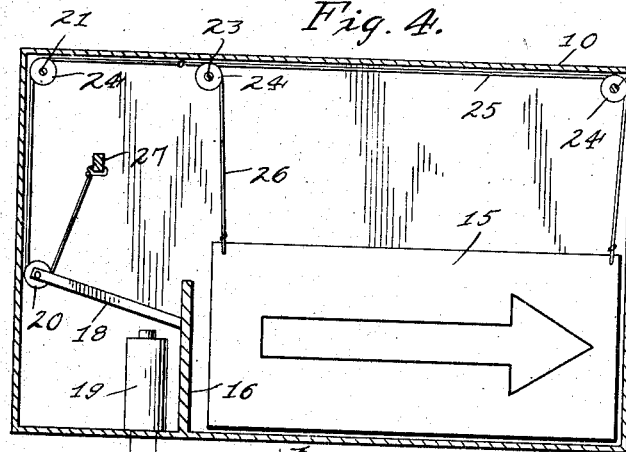
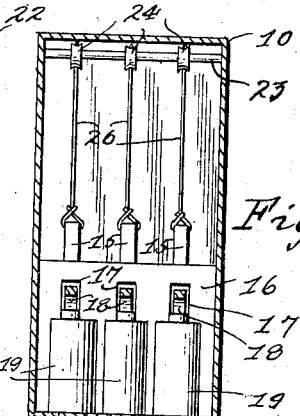
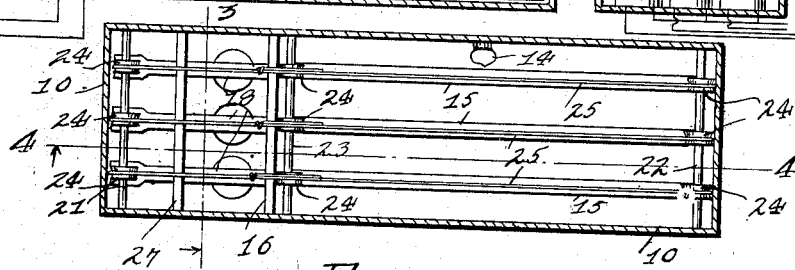
Witnesses
Inventor
R. F. Darrow.
By
Attorneys.

UNITED STATES PATENT OFFICE.

ROBERT F. DARROW, OF EAST CHICAGO, INDIANA.

SIGNALING DEVICE FOR AUTOMOBILES.

1,175,051.   Specification of Letters Patent.   Patented Mar. 14, 1916.

Application filed August 13, 1915. Serial No. 45,394.

*To all whom it may concern:*

Be it known that I, ROBERT F. DARROW, a citizen of the United States, residing at East Chicago, in the county of Lake, State of Indiana, have invented certain new and useful Improvements in Signaling Devices for Automobiles; and I do hereby declare the following to be a full, clear, and exact description of the invention, such as will enable others skilled in the art to which it appertains to make and use the same.

This invention relates to improvements in signaling devices for automobiles.

The principal object of the invention is to provide a novel and efficient device for attachment to the rear of an automobile for signaling to the following vehicle a change in direction.

Another object is to provide a device of this character which can be quickly and easily operated by the driver of the automobile without necessitating removing of the hands from the steering wheel.

Other objects and advantages will be apparent from the following description, when taken in connection with the accompanying drawing.

In the drawing: Figure 1 is a rear elevation of an automobile equipped with my signaling device. Fig. 2 is an enlarged horizontal section on the line 2—2 of Fig. 1, Fig. 3 is a transverse section on the line 3—3 of Fig. 2, and Fig. 4 is a longitudinal section on the line 4—4 of Fig. 2.

Referring particularly to the accompanying drawing, 10 represents a casing which is secured to the rear of the body of the automobile 11. Formed in the rear wall of the casing and in the upper right hand portion thereof is an opening 12 in which is secured a suitable transparent element 13, and behind which is mounted an electric lamp 14. Disposed in the casing below the opening 12 are a plurality of plates 15, one of which is provided with the word "Stop" while the others are provided with arrows pointing to the right and left respectively. Extending transversely in the casing, below the inner end of the opening 12 is a wall 16 in which there are formed a plurality of vertical slots 17, and in these slots are pivotally mounted the armature bars 18 of the electromagnets 19. The ends of the armature bars are provided with the grooved wheels 20, the purpose of which will appear later. Extending transversely of the upper end portions of the casing are the shafts 21 and 22. A third shaft 23 is disposed transversely in the upper portion of the casing at a point adjacent the upper inner corner of the opening 12. Each of these shafts is provided with a number of grooved wheels 24 equal to the number of armature bars 18. Connected to the upper and outer corners of the plates 15 are the wires 25 which extend upwardly over the pulleys of the shaft 22 and extend in a direction toward the shaft 23, where they are connected to the upper ends of similar wires 26 connected to the upper inner corners of the plates 15. The wires 25 extend over the wheels of the shaft 21 and downwardly under the grooved wheels 20 from whence they extend upwardly and are secured to a transverse stationary bar 27. It will thus be seen that when any one of these armature bars is attracted by its magnet the wheel 20 will draw on one of the wires 25 and exert a pull on the outer end of the attached plate 15 and on the inner end of the plate of the wire 26 so that the proper plate will be raised into position behind the opening 12. It will of course be understood that these plates 15 are transparent or semi-transparent with the words formed in solid black thereon or the plates may be in the form of stencils, that is metal plates with the letters of the words cut therethrough. This is to permit the light from the lamp 14 to illuminate the plate and the word thereon so that it can be seen at a proper distance from the rear of the vehicle.

The electromagnets 19 are all in the battery or magneto circuit of the automobile, and each one is connected with a circuit closing push button carried by the steering wheel of the automobile. Thus by the simple pressure on one of the buttons, one of the electromagnets will be energized to draw one of the arms 18 downwardly and operate the proper wires to raise the appropriate plate 15 behind the opening 12.

What is claimed is:

An automobile signaling device comprising a casing having a sight opening in the rear wall thereof, a plurality of signal plates disposed within the casing below the opening, transverse shafts mounted in the upper portion of the casing and carrying grooved wheels, electromagnetic devices mounted in the casing, pivoted armatures movable toward and away from the electromagnetic devices, grooved wheels carried by the ends of the armatures, and flexible elements connected at their ends respectively to the signal plates and casing and having their intermediate portions engaging the grooved wheels of the shafts and the armatures.

In testimony whereof, I affix my signature, in the presence of two witnesses.

ROBERT F. DARROW.

Witnesses:
 GEORGE W. DARROW,
 FRANK C. OTT.